United States Patent
Dreibholz et al.

(10) Patent No.: US 7,762,922 B2
(45) Date of Patent: Jul. 27, 2010

(54) METHOD FOR OPERATING A PARALLEL HYBRID DRIVE TRAIN OF A VEHICLE

(75) Inventors: Ralf Dreibholz, Meckenbeuren (DE); Johannes Kaltenbach, Friedrichshafen (DE); Michael Gromus, Tettnang (DE); Stefan Blattner, Vogt (DE); Bernd Allgaier, Kressbronn (DE); Stefan Kilian, Friedrichshafen (DE); Peter Schiele, Kressbronn (DE); Friedrich Tenbrock, Langenargen (DE); Gerd Frotscher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 481 days.

(21) Appl. No.: 11/702,293

(22) Filed: Feb. 5, 2007

(65) Prior Publication Data

US 2007/0207892 A1    Sep. 6, 2007

(30) Foreign Application Priority Data

Feb. 7, 2006    (DE) .................. 10 2006 005 468

(51) Int. Cl.
    *B60W 10/08* (2006.01)
(52) U.S. Cl. ........................ 477/5; 180/65.21
(58) Field of Classification Search .................. None
    See application file for complete search history.

(56) References Cited

U.S. PATENT DOCUMENTS

| | | | |
|---|---|---|---|
| 6,077,186 A * | 6/2000 | Kojima et al. ............. | 477/3 |
| 6,342,027 B1 * | 1/2002 | Suzuki ..................... | 477/5 |
| 7,160,225 B2 * | 1/2007 | Berger et al. .............. | 477/5 |
| 2002/0117339 A1 | 8/2002 | Nakashima | |
| 2004/0121882 A1 * | 6/2004 | Tajima et al. ............. | 477/3 |
| 2004/0127327 A1 * | 7/2004 | Kahlon et al. ............. | 477/5 |

(Continued)

FOREIGN PATENT DOCUMENTS

DE    100 26 332 A1    7/2001

(Continued)

*Primary Examiner*—David D Le
*Assistant Examiner*—Justin Holmes
(74) *Attorney, Agent, or Firm*—Davis & Bujold, P.L.L.C.

(57) ABSTRACT

A method is described for operating a parallel hybrid device train (1) of a vehicle having an internal combustion engine (2), an electric engine (3) and an output (5) wherein the electric engine (3) is disposed in the power train between the output (5) and the internal combustion engine (2) and both between the internal combustion engine (2) and the electric engine (3) and between the electric engine (3) and the output (5) is respectively provided a frictionally engaged shifting element (7, 8). In addition, a nominal output torque abutting on the output (5) can be adjusted according to the transmitting capacity of the first shifting element (8) located between the electric engine (3) and the output (5). According to the invention, the transmitting capacity of the first shifting element (8) is adjusted under control according to the nominal input torque required so that the first shifting element (8) has a transmitting capacity needed for producing the nominal output torque on the output (5). Furthermore, an input rotational speed of the electric engine (3) is adjusted under regulation during a starting process of the internal combustion engine (2) in order to keep the first shifting element in slip operation at least during the starting process of the internal combustion engine (2) and to produce the nominal output torque on the output (5).

13 Claims, 8 Drawing Sheets

U.S. PATENT DOCUMENTS

2005/0155803 A1\* 7/2005 Schiele .................. 180/65.2
2006/0266568 A1 11/2006 Barske

FOREIGN PATENT DOCUMENTS

| | | |
|---|---|---|
| DE | 100 65 760 A1 | 7/2002 |
| DE | 103 27 306 A1 | 1/2005 |
| DE | 103 53 256 B3 | 3/2005 |
| DE | 10 2004 002 061 A1 | 8/2005 |
| WO | WO-98/40647 | 9/1998 |

\* cited by examiner

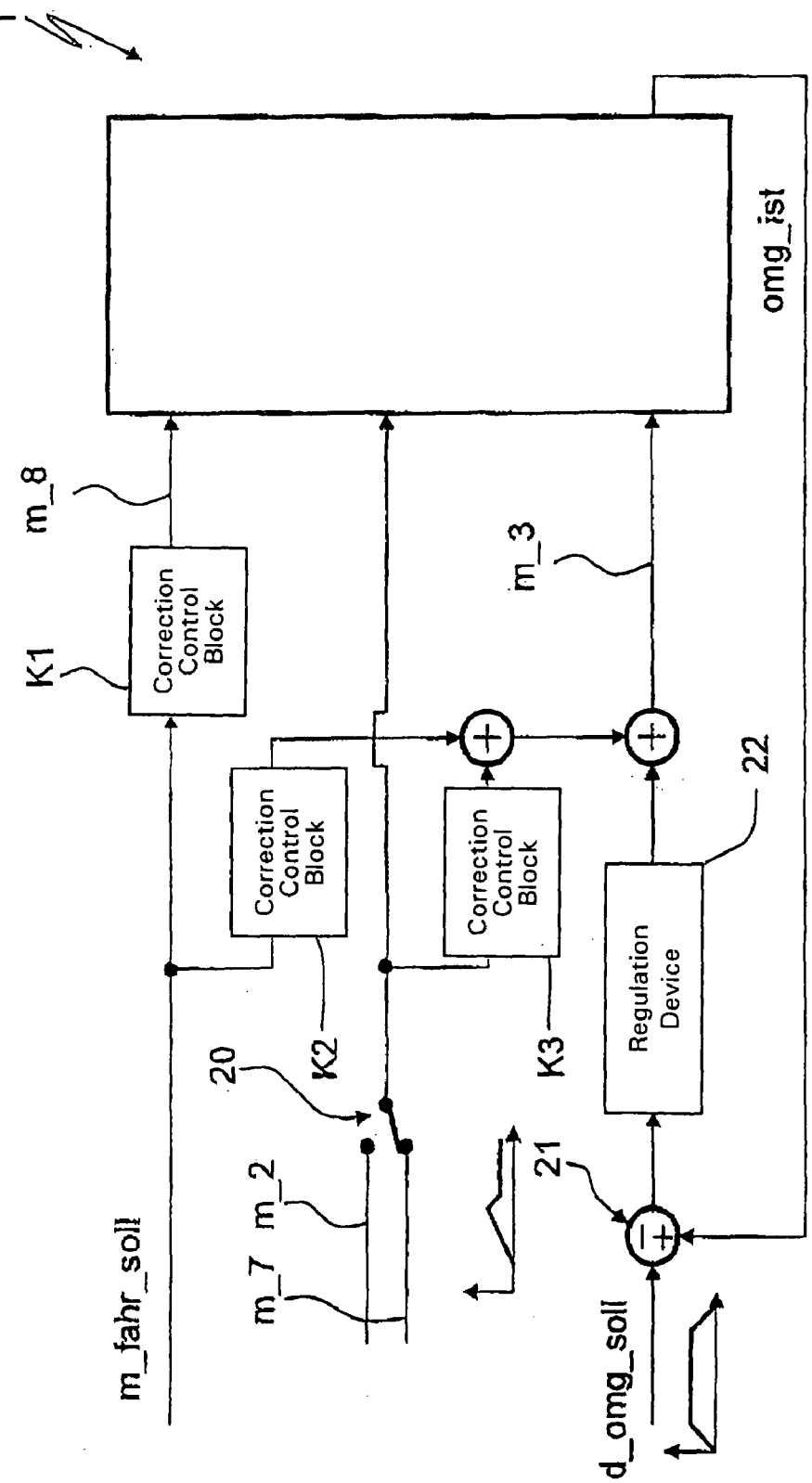

METHOD FOR OPERATING A PARALLEL HYBRID DRIVE TRAIN OF A VEHICLE

This application claims priority from German Application Serial No. 10 2006 005 468.7 filed Feb. 7, 2006.

FIELD OF THE INVENTION

The invention concerns a method for operating a parallel hybrid drive train of a vehicle.

BACKGROUND OF THE INVENTION

DE 10 2004 002 061 A1 has disclosed a method for control and regulation of a drive train of a hybrid vehicle and a drive train of a hybrid vehicle. With the method for control and regulation of a drive train of a hybrid vehicle having an internal combustion engine, an electric engine, a shifting element located between the electric engine and an output in a power flow of the drive train and a shifting element designed with continuously variable transmitting capacity and a clutch device situated between the electric engine and the internal combustion engine and by way of which the electric engine and the internal combustion engine can be brought to operative connection, a drive train of a hybrid vehicle be operable in a manner such that a transition from a drive of the hybrid vehicle by the electric engine to a parallel drive of the hybrid vehicle via the electric engine and the internal combustion engine or to a pure drive on the side of the internal combustion engine of the hybrid vehicle, the same as a starting operation of the internal combustion engine via the electric engine, can be carried out without reaction torques on the drive train side noticeable for the driver of the hybrid vehicle.

In the operation of the drive train, the transmitting capacity of the shifting element can be adjusted for the purpose during a starting process of the internal combustion engine so that on the output of the drive train abuts a torque independent of a starting process of the internal combustion engine, there being prevented on the output, preferably by a slip operation of the shifting element, torques appearing on the output as result of the starting of the internal combustion engine.

In the method, the rotational speed of the electric engine during the starting phase of the internal combustion engine is raised to a rotational speed value at which is ensured that during the whole starting process of the internal combustion engine, the shifting element between the electric engine and the output of the drive train be kept in a slip operation. The rotational speed value is calculated via an algorithm implemented in the engine control and/or in the transmission control and/or in a superimposed torque manner.

However, it is here disadvantageous that the calculated rotational speed value, under operating conditions that change during the starting process of the internal combustion engine, is in circumstances too low and the shifting element is not slip operated over the whole starting process of the internal combustion engine. It is further possible also that the rotational speed value of the rotational speed of the electric engine determined for the operating state existing at the calculation moment be basically too high for the operating states of the drive train that follow wherefore a load of the shifting element caused by the slip in the area of the shifting element assumes undesirably high values.

Therefore, the problem on which the instant invention is based is to make available for operating a parallel hybrid drive train of a vehicle a method by means of which a shifting element between an electric engine and an output of a vehicle can be slip operated during the whole starting process so as to make possible preventing on the output side of the drive train reactions that diminish the driving quality, the same as inadmissibly high loads for the shifting element.

SUMMARY OF THE INVENTION

With the inventive method for operating a parallel hybrid drive train of a vehicle having an internal combustion engine, an electric engine and an output wherein the electric engine is situated in the power train between the output and the internal combustion engine and wherein both between the internal combustion engine and the electric engine and between the electric engine and the output one frictionally engaged shifting element is respectively provided and wherein a nominal output torque abutting on the output can be adjusted according to the transmitting capacity of the first shifting element located between the electric engine and the output, it being possible to slip operate the shifting element between the electric engine and the output of the parallel hybrid drive train during the whole starting process with less load compared with conventionally operated drive trains of hybrid vehicles.

This is accomplished by the fact that the transmitting capacity of the first shifting element is adjusted under control according to the required nominal output torque so that the first shifting element has the transmitting capacity required for producing the nominal output torque on the output and that a driving rotational speed of the electric engine is regulatedly adjusted during the starting process of the internal combustion engine in order to keep the shifting element in slip operation at least during the starting process of the internal combustion engine and to produce on the output the nominal output torque.

By the inventive procedure of regulatedly adjusting the driving rotational speed of the electric engine during the starting process of the internal combustion engine, it also is easily possible to adapt the driving rotational speed of the electric engine during the starting process of the internal combustion engine to changing operating states of the parallel hybrid drive train so that the shifting element between the electric engine and the output be permanently slip operated, it being possible by the regulation to reduce the slip on the shifting element to a required minimum so that the loads of the shifting element resulting from the slip operation be reduced in comparison with drive trains of hybrid vehicles already known from the prior art.

BRIEF DESCRIPTION OF THE DRAWINGS

The invention will now be described, by way of example, with reference to the accompanying drawings in which:

FIG. 8 is a gearshift pattern of a regulation structure for control and regulation of the slip of the shifting element between the electric engine and the output of the parallel hybrid drive train according to FIG. 1 during a starting process of a vehicle and a starting process of the internal combustion engine.

DETAILED DESCRIPTION OF THE INVENTION

Figure 1:
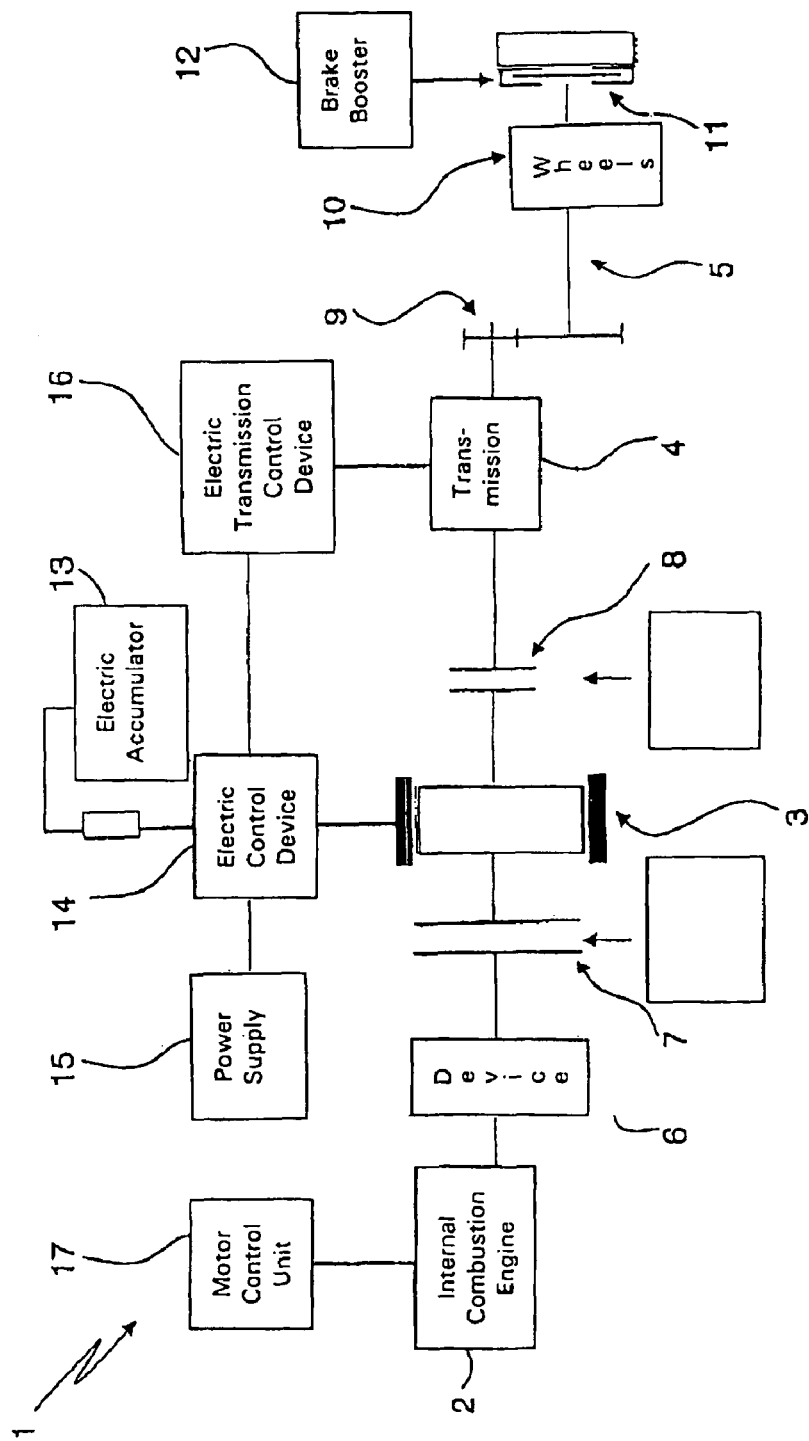
FIG. 1 is an extensively schematized representation of a parallel hybrid drive train.

FIG. 1 shows a parallel hybrid drive train 1 of a vehicle in extensively schematic representation in the form of a block gearshift pattern. The parallel hybrid drive train 1 comprises an internal combustion engine 2, an electric engine 3, a transmission 4 and an output 5. Between the internal combustion engine 2 and the electric engine 3 are located a device 6 for damping rotational irregularities and a frictionally engaged shifting element 7.

By way of the shifting element 7, an operative connection can be created between the internal combustion engine 2 and the electric engine 3 in order to make possible producing different operating states of the parallel hybrid drive train 1 of the vehicle such as a drive exclusively via the electric engine 3, a parallel drive via the internal combustion engine 2 and the electric engine 3, or drive exclusively via the internal combustion engine 2.

By arranging the shifting element 7 between the internal combustion engine 2 and the electric engine 3, it is further possible, via the shifting element 7 to connect the internal combustion engine 2 to the electric engine 3 only when the electric engine 3 has the rotary energy required for a starting process of the internal combustion engine so that the internal combustion engine 2 is started by the electric engine 3.

Between the electric engine 3 and the transmission 4, which is located on the side of the electric engine 3 remote from the internal combustion engine 2, there is additionally situated another shifting element 8 having continuously variable transmitting capacity by way of which the electric engine 3 can be brought to operative connection with the transmission 4 and the output 5. The transmission 4 is here designed as conventional automatic transmission by way of which different ratios can be produced and the transmission can be any transmission known per se from the practice which can be combined both with integrated starting clutch or a separate starting element such as a frictionally engaged clutch not utilizable to produce a ratio in an automatic transmission.

On the side remote from the first shifting element 8 or on the exit side, the transmission 4 is operatively connected with the wheels 10 of a vehicle input axle of the parallel hybrid drive train 1. In the area of the wheels 10 is shown part of a brake system 11 designed with a so-called brake booster 12. The brake booster 12 represents a device by way of which the brake system, during coasting operation of the parallel hybrid drive train 1, is automatically actuated to produce a counter coasting torque on the output when an electric accumulator 13 coordinated with the electric engine 3 is completely loaded by the generatively operated electric engine 3 and no sufficient motor brake torque can be produced on the output 5 by the electric engine 3. The electric accumulator 13 is connected via an electric control 14 with the electric engine 3, one power supply 15 and one electric transmission control device 16, the last mentioned transmission control device 16 being provided for control of the transmission 4. For control of the internal combustion engine 2, one motor control unit 17 is provided.

Figure 2:
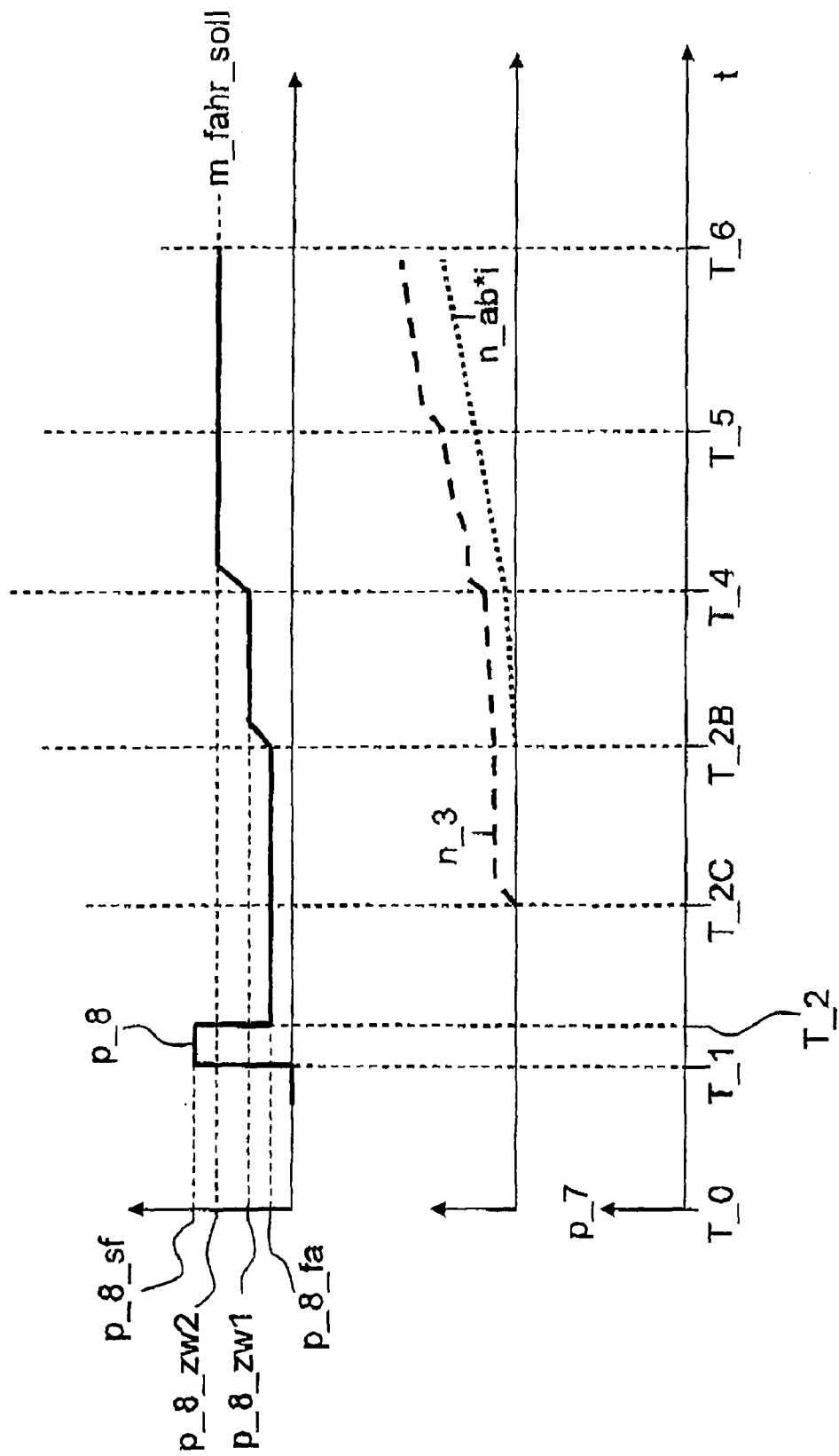
FIG. 2 shows several curves corresponding with each other of operating parameters of different components of the parallel hybrid drive train of FIG. 1, which adjust themselves during a starting process of a vehicle constructed according to FIG. 1.
Figure 3:
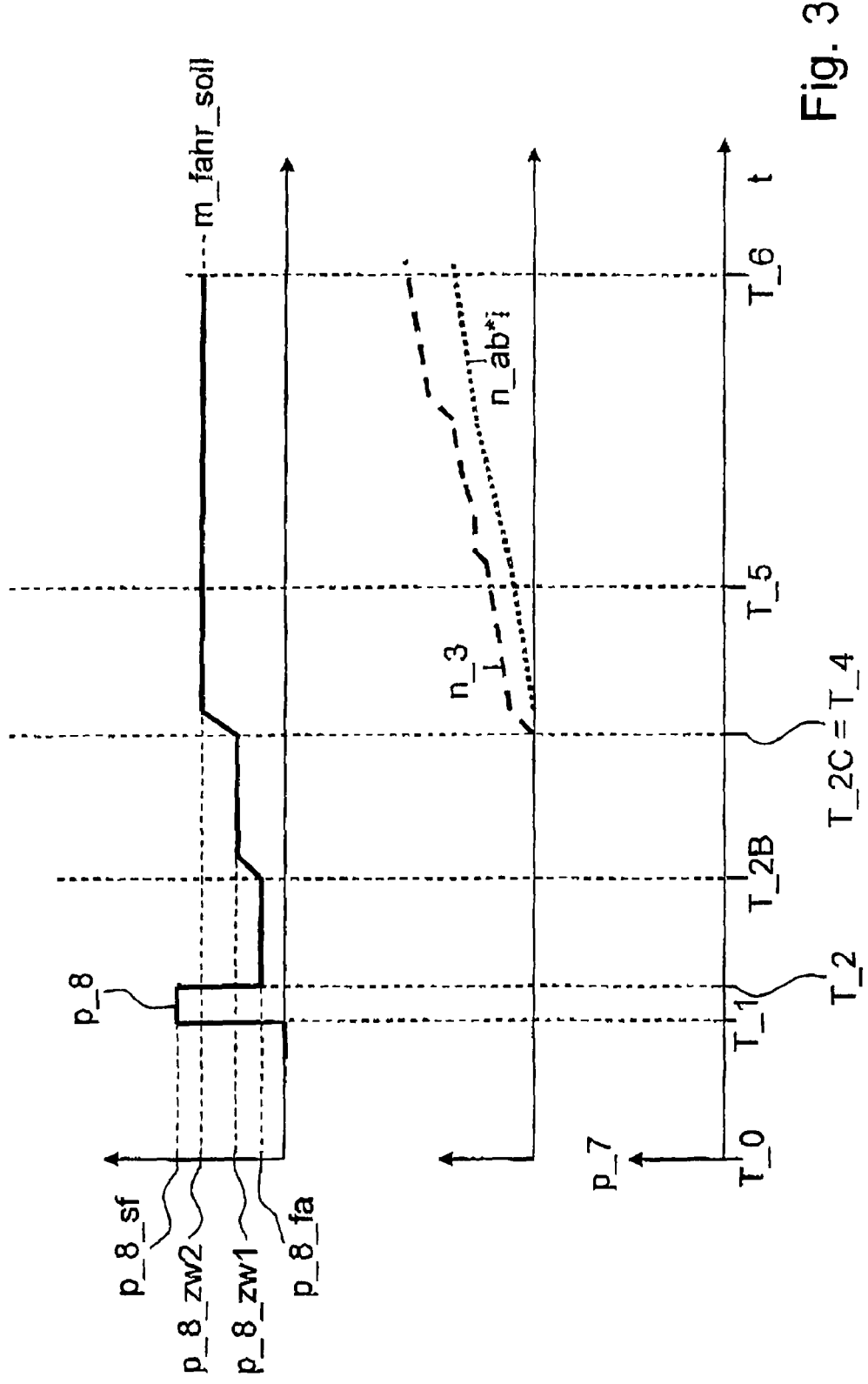
FIG. 3 is a representation corresponding to FIG. 2 of the curves of the operating parameters of different components which adjust themselves during a starting process diverging from the starting process basis of the curves according to FIG. 2.
Figure 4:
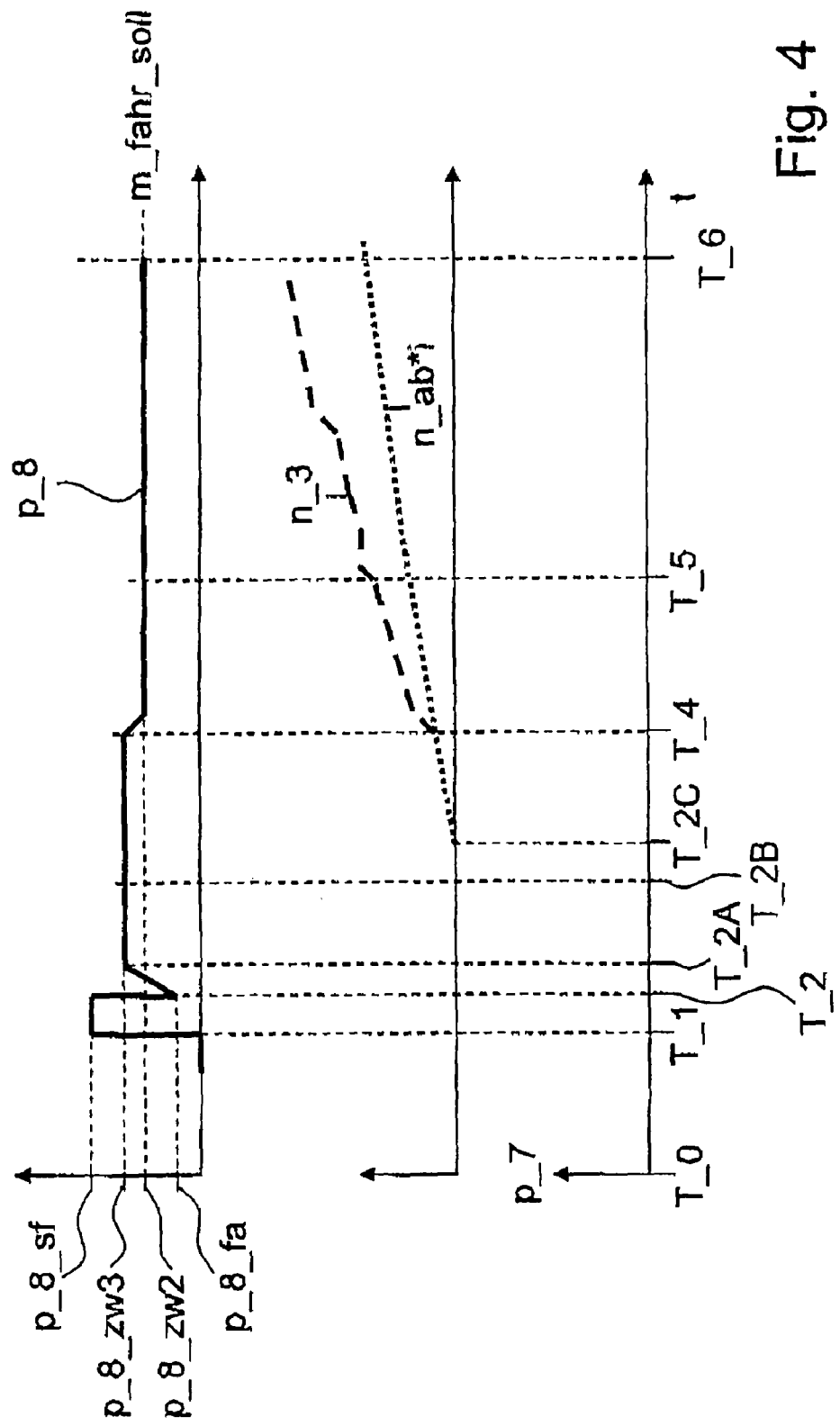
FIG. 4 is a representation of the operating parameter curves corresponding to FIG. 2 and FIG. 1, which adjust themselves during a starting process diverging from the starting processes basis of the operating parameter curves according to FIG. 2 and FIG. 3.

In FIG. 2 to FIG. 4 are shown in each several curves of operating state parameters of the components of the parallel hybrid drive train 1 shown in FIG. 1 each of which adjusts itself during different ongoing starting processes of a vehicle, the operating parameters being in essence qualitatively on the same level at the end of the starting processes.

Figure 5:
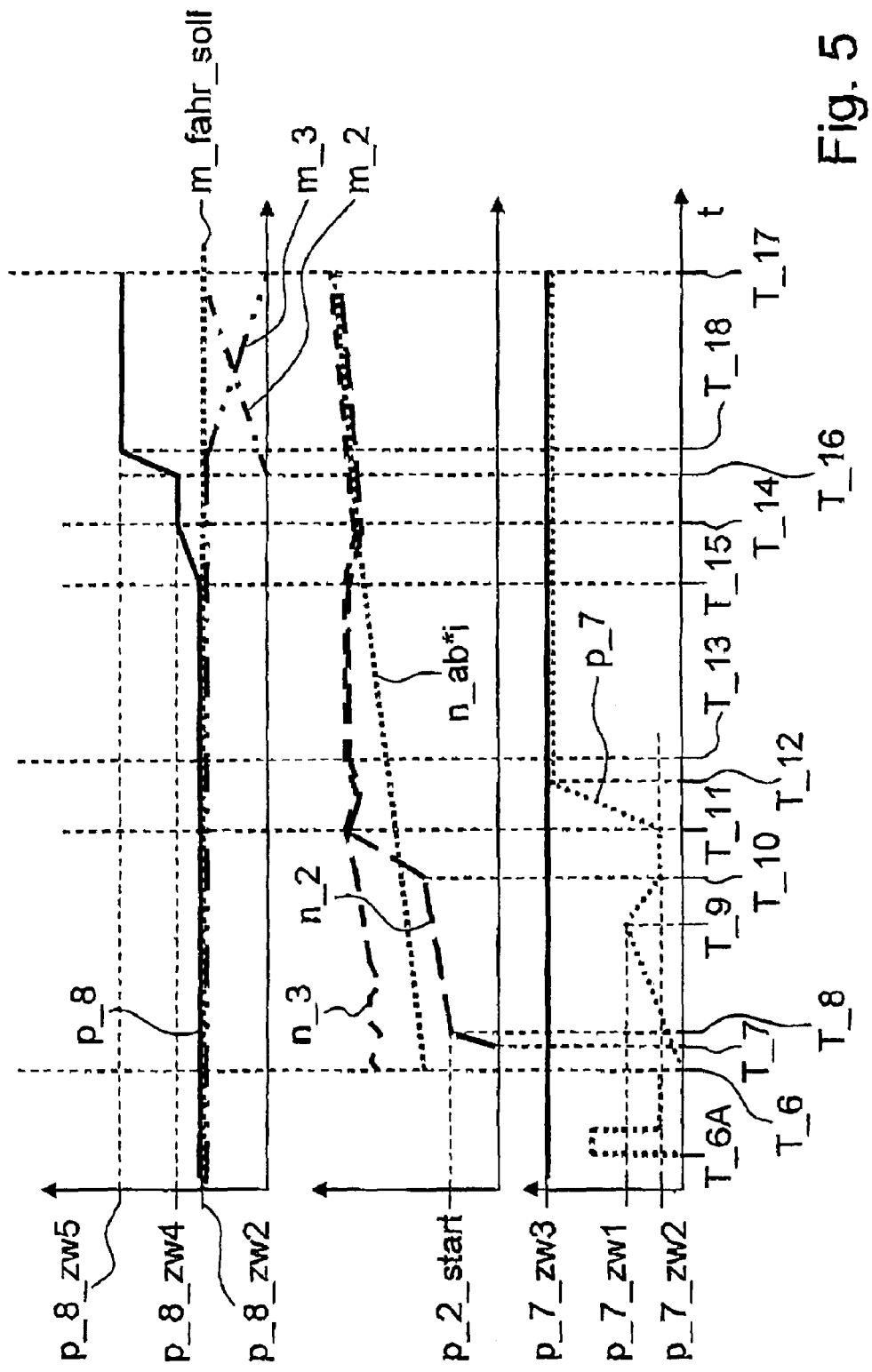
FIG. 5 shows curves of operating parameters of different components of the parallel hybrid drive train according to FIG. 1, which adjust themselves during a starting process of the internal combustion engine, the starting process attaching itself to one of the starting processes according to FIG. 2 to FIG. 4.
Figure 6:
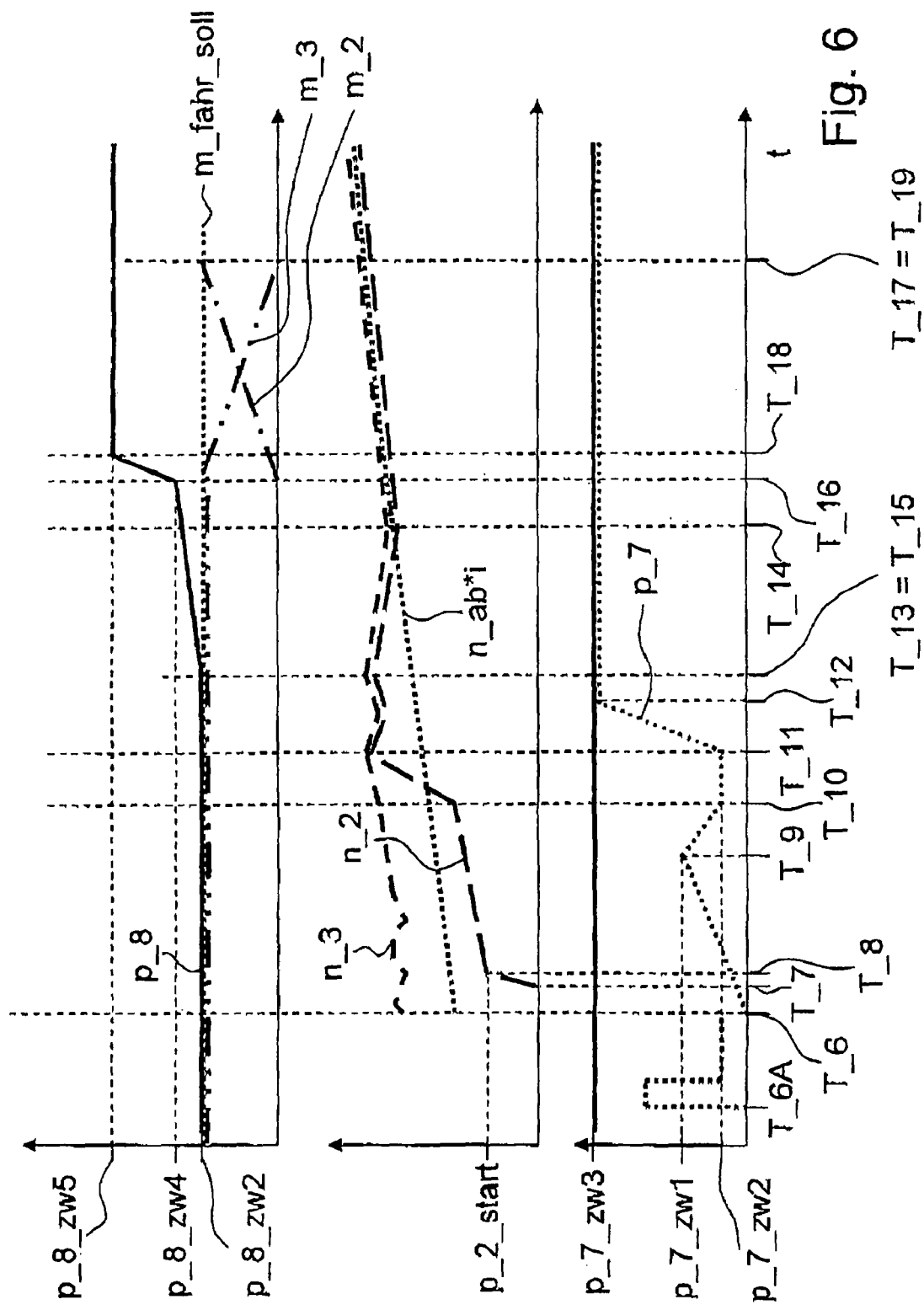
FIG. 6 is a representation corresponding to FIG. 5 of operating parameter curves which adjust themselves during a starting process diverging from the starting process basis of the operating parameter curves according to FIG. 5.
Figure 7:
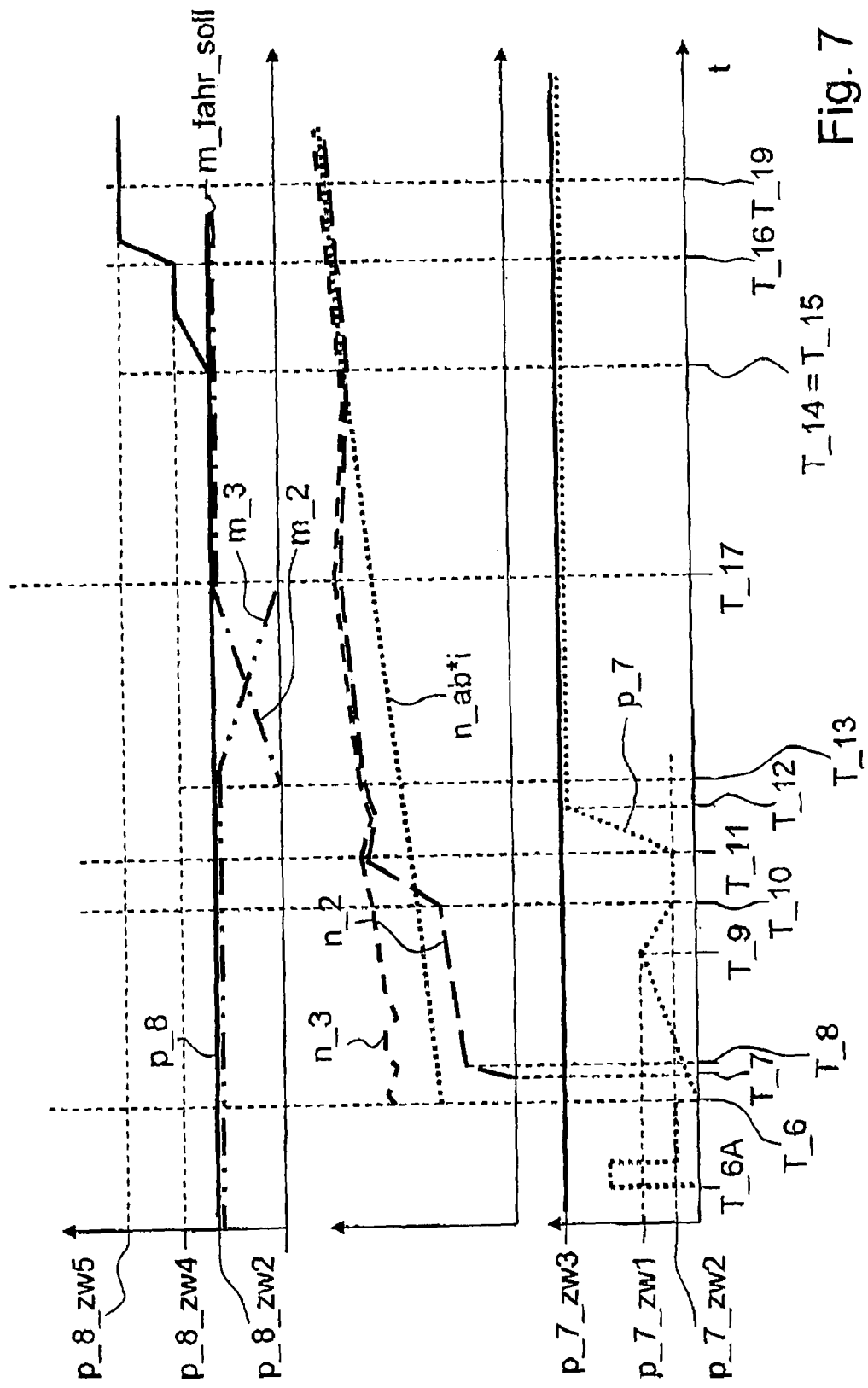
FIG. 7 is a representation corresponding to FIG. 5 and FIG. 6 of operating parameter curves which adjust themselves during a starting process diverging from the starting processes basis of the operating parameter curves according to FIG. 5 and FIG. 6.

In FIG. 5 to 7 are, in addition, shown curves of the operating parameters shown in FIG. 2 to FIG. 4 during different starting processes on the electric engine side of the internal combustion engine 2 of the parallel hybrid drive train 1 according to FIG. 1. The curves shown in FIG. 5 to FIG. 7 of the operating parameters adjust themselves each independently of the curves shown in FIG. 2 to FIG. 4 of the operating parameters so that different starting processes of a vehicle can easily be combined with starting processes divergent from each other of the internal combustion engine and be designed as described herebelow with great driving comfort and low expenditure in control and regulation without having to deposit in the control units of the parallel hybrid drive train 1 specially synchronized alternatives of the method.

At the same time, the starting processes of a hybrid vehicle on which are based the curves shown in FIG. 2 to FIG. 4 of the operating parameters of the different components of the parallel hybrid drive train 1 are at first carried out only via the electric engine 3. As the time t lengthens, the internal combustion engine 2 is started in the manner described herebelow by way of the electric engine 3 and then stands available as needed as drive line for driving the vehicle, the curves of the operating parameters of the different components of the parallel hybrid train 1 each adjusting itself in the manner shown in FIG. 5 to FIG. 7 during different starting processes of the internal combustion engine 2.

Between the moments $T\_0$ and $T\_6$ shown in FIG. 2 to FIG. 4, there actually takes place a starting process of a starting phase of a vehicle in which the vehicle is driven exclusively by the electric engine 3. Departing from the moment $T\_0$, which here characterizes in principle the starting point of an activating process of a ratio in the transmission 4 and of a starting process that attaches thereto, a control pressure $p\_8$ of the first shifting element 9 of the parallel hybrid drive train 1, also constructed here as a shifting element to produce at least one starting ratio of the transmission 4 designed as automatic transmission with continuously variable transmitting capacity, is essentially zero so that in the transmission 4 at first no ratio step or starting ratio is activated.

At a moment $T\_1$, the control pressure $p\_8$ of the second shifting element 8 is raised to a quick filling pressure $p\_8\_sf$ and constantly held at this value up to a moment $T\_2$ which represents the end of a so-called quick filling phase of the second shifting element 8. At the moment $T\_2$, the control pressure $p\_8$ is lowered from the quick filling pressure $p\_8\_sf$ to a so-called filling equalizing pressure $p\_8\_fa$ of a so-called filling equalizing phase of the first shifting element 8 and is held at this value up to a moment $T\_2B$. At a moment $T\_2C$, the rotational speed n_3 of the electric engine 3, which prior to the moment T_2C is essentially zero, is raised to a predefined value and constantly adjusted to the value up to the moment T_2B. At the moment T_2B, the control pressure p_8 of the first shifting element 8 is raised to a first intermediate pressure value p_8_zw1 from a filling equalizing pressure at which essentially no torque can be passed via the first shifting element 8 whereby the transmitting capacity of the first shifting element 8 increases. The increase of the transmitting capacity of the first shifting element also leads to an increase of the rotational speed n_ab*i of the output-side clutch half of the first shifting element 8 which is lower than the rotational speed of the electric machine-side clutch half of the first shifting element 8 which corresponds to the rotational speed n_3 of the electric machine 3. The reference n_ab corresponds here to the output rotational speed and the reference i to a total ratio composed of the total ratio of the transmission 4 and of the axle differential 9.

The raise of the transmitting capacity of the first shifting element 8 and a second lesser raise between the moment T_2B and a moment T_4 of the rotational speed of the electric engine 3 results in a build up of a creep torque on the output 5 which produces a raise of the rotational speed n_ab*i of the output side clutch half of the first shifting element 8. In this phase of the starting process of the vehicle, the first shifting element 8 is slip operated, since the rotational speed n_3 of the electric engine 3 and thus of the electric engine side clutch half of the first shifting element 8 is higher than the rotational speed n_ab*i of the output side clutch half of the first shifting element 8.

At the moment T_4, a driver's wish standard results by actuation of a power demand element, such as an accelerator pedal, whereby the rotational speed n_3 of the electric engine 3 is raised in the manner shown by the curve of the rotational speed n_3 up to the moment T_6. The control pressure p_8 of the first shifting element 8 is at the same time raised to a second intermediate pressure value p_8_zw2 at which the first shifting element 8 has a transmitting capacity such that in the slip operation of the first shifting element 8 a nominal output torque m_fahr_soll demanded by the driver abuts on the output 5 of the parallel hybrid drive train 1.

The starting process on which are based the curves of the operating parameters according to FIG. 3 differs from the starting process basis of the curves of the operating parameters according to FIG. 2 by the fact that the moment T_2B at which the control pressure p_8 of the first shifting element 8 is raised from the filling equalizing pressure p_8_fa to the first intermediate pressure value p_8_zw1 and the moment T_2C at which the rotational speed n_3 of the electric engine 3 rises and the control pressure p_8 of the first shifting element 8 is raised from the first intermediate pressure value p_8_zw1 to the second intermediate pressure value p_8_zw2, coincide. An output torque thus abuts already at the moment T_2B on the output 5 of the parallel hybrid drive train 1. The first shifting element 9 is here in relation to the input torque applied by the electric engine 3 with a transmitting capacity such that the input torque of the electric engine 3 is transmitted slip-free in direction of the output 5 by the first shifting element 8.

At the moment T_4, when the drive issues a desired standard for increasing the input torque, the input torque of the electric engine 3 increases. Since the transmitting capacity of the first shifting element 3 at this moment is not changed being now also insufficient slip-free to relay in direction of the output 5 the input torque applied by the electric engine 3, it converts to a slip operation wherefore from the moment T_4 a difference exists between the curves of the rotational speed n_3 of the electric engine and the rotational speed n_ab*i of the output side clutch half of the first shifting element 8.

In the starting process basis of the curves shown in FIG. 4 of the operating parameters of the parallel hybrid drive train 1, the control pressure p_8 is raised at the end of the quick filling phase, that is, at the moment T_2, departing from the filling equalizing pressure p_8_fa to a third pressure value p_8_zw3 at which the first shifting element 8 has a transmitting capacity with which the first shifting element 8 is entirely closed.

At the moment T_2C, the rotational speed n_3 of the electric engine 3 is raised, the rotational speeds of both clutch halves of the first shifting element 8, as result of the closed state of the first shifting element 8, being equally high between the moment T_2C and T_4. Then follows at the moment T_4, a driver's power demand which results in a lowering of the control pressure p_8 of the first shifting element 8 from the third intermediate pressure value p_8_zw3 to the second intermediate pressure value p_8_zw2 and an increase of the rotational speed of the electric engine 3. Both steps last mentioned result in that the first shifting element 8 from the moment T_4 converts to a slip operation and the first shifting element 8 has a transmitting capacity which is required for producing the nominal output torque m_fahr_soll demanded by the driver and abut on the output.

The second shifting element 7 is entirely open between the moments T_0 to T_6 whereby the operative connection between the electric engine 3 and the internal combustion engine 2 disengaged during the starting process is interrupted. This means that the control pressure p_7 of the second shifting element 7 is substantially zero.

At the moment T_6, that is, at the end of the starting processes bases of the curves of the operating parameters, the parallel hybrid drive train 1 according to FIG. 1 is at the moment prepared in essentially the same manner for a starting process on the side of the electric engine of the internal combustion engine 2 in the sense that the first shifting element 8 is in slip operation with a transmitting capacity with which one nominal output torque m_fahr_soll demanded by the driver can be produced on the output 5 of the parallel hybrid drive train 1. The slip operation of the first shifting element 8 during a starting process of the internal combustion engine 2 is aimed at damping in the area of the slip operated first shifting element 8 the torque oscillations caused by the engagement of the internal combustion engine in the part of the parallel hybrid drive train 1 that regarding the first shifting element 8 is on the side of the internal combustion engine and cause on the output torque abutting on the output no changes due to the starting of the internal combustion engine 2.

At the moment T_6A preceding in time the moment T_6, there is started a filling phase of the second shifting element 7, which is composed of a quick filling phase and a filling equalizing phase and prepares the second shifting element 7 for an engagement, terminating at the moment T_6. At the moment T_6, the control pressure p_7 of the second shifting element 7 is raised, as shown in FIG. 5, FIG. 6 and FIG. 7, to a first intermediate pressure value p_7_zw1 whereby the transmitting capacity of the second shifting element 7 increases and the internal combustion engine 2 is driven by the electric engine 3. Thereby the rotational speed n_2 of the internal combustion engine 2 is raised at a moment T_8 from zero to a starting rotational speed n_2_start and started at a moment T_8 at which the gradient of the curve of the rotational speed n_2 of the internal combustion engine changes.

The transmitting capacity of the second shifting element 7 is increased at the moment T_9 up to the first intermediate pressure value p_7_zw1 and then lowered via a pressure ramp until the moment T_10 down to a second intermediate pressure value p_7_zw2 and kept at this value up to a moment T_11 at which the rotational speed of the internal combustion engine 2 correspond to the rotational speed n_3 of the electric engine 3. The second shifting element 7, now in synchronous state, is completely closed by raising the control pressure p_7 whereby the internal combustion engine 2 is non-rotatably connected with the electric engine 3.

The conveyance of the control pressure p_7 of the second shifting element 7 causes the rotational speed n_2 of the internal combustion engine to be raised only slightly, via the starting rotational speed n_2_start, from the engagement moment T_8 to the moment T_10 and be converted to an operating state without rotational irregularities. Departing from the operating state, the rotational speed n_2 is conveyed with considerably steeper gradient to the rotational speed n_3 of the electric engine 3 whereby the second shifting element 7 is converted at least approximately to a slip-free operating state. Thereby the second shifting element 7 can be closed without producing reaction torques on the drive train side of the parallel hybrid drive train 1 via the pressure ramp provided between the moments T_11 and T_12. After the moment T_12, the control pressure n_7 of the second shifting element 7 is permanently left on a third intermediate pressure value p_7_zw3, which substantially corresponds to a retaining pressure at which the second shifting element 7 has its full transmitting capacity.

Up to the moment T_12, the first shifting element 8, the same as before, is run in the slip operation required for a great driving comfort according to the driver's preset nominal output torque m_fahr_soll and a nominal slip standard d_omg_soll with the aid of a regulation structure shown in detail in FIG. 8.

Up to the moment T_12 at which the second shifting element 7 is completely closed, as shown in FIG. 5 to FIG. 7, the curves of the operating parameters of the different components of the parallel hybrid drive train 1, according to FIG. 1, have no substantial difference. Only after the moment T_12 do the starting processes respectively basis of the curves shown in FIG. 5 to FIG. 7, differ in the manner how the first shifting element 8 is converted to a synchronous operating state and then entirely closed, the same as in the moment when a load take-over occurs from the electric engine 3 to the internal combustion engine 2.

In the starting process basis of the curves, shown in FIG. 5, the slip of the first shifting element 8 is steadily reduced after detection of the adhesion of the second shifting element 7 by adequate control of the rotational speed n_2 of the internal combustion engine 2 and control and regulation of the rotational speed n_3 of the electric engine 3 between moments T_13 and T_15, the moment T_13 corresponding to the moment at which has been detected the adhesion of the second shifting element 7. By the expression adhesion is here understood as a condition of the second shifting element 7 in which the second shifting element 7 is operated, via a predefined space of time, at a differential rotational speed lower than a predefined threshold value of the slip of the second shifting element 7.

At a moment T_15, the control pressure p_8 of the first shifting element 8 is raised, via a pressure ramp, departing from a second intermediate pressure value p_8_zw2 to a fourth intermediate pressure value p_8_zw4 where the transmitting capacity of the first shifting element 8 increases between the moments T_15 and T_14 so that the first shifting element 8 is at the end of the pressure ramp at least approximately in a slip-free operating state and the rotational speed n_3 of the electric engine 3, the rotational speed n_2 of the internal combustion engine 2 and the rotational speed n_ab*i of the input side halves of the clutch of the first shifting element 8 are substantially equal. After a moment T_14, the control pressure p_8 of the first shifting element 8 is kept constant on the fourth intermediate pressure value p_8_zw4 up to a moment T_18 to a fifth pressure value p_8_zw5 at which the first shifting element 8 is completely closed and has its full transmitting capacity.

At the moment T_16 is, at the same time, started a load take-over phase from the electric engine 3 to the internal combustion engine 2, an input torque m_3 of the electric engine 3 is lowered, as shown in FIG. 5, between the moments T_16 and T_17 and an input torque m_2 of the internal combustion engine 2 is increased at the moment delimited by the moments T_17 and T_16 so as to make possible fully producing by the internal combustion engine 2 on the output 5 at the moment T_17 the nominal output torque m_fahr_soll demanded by the driver.

The starting process on which are based the curves shown in FIG. 6 differs from the starting process basis of the curves shown in FIG. 5 in the sense that the moment T_15 at which the control pressure p_8 of the first shifting element 8 is raised departing from the second intermediate pressure value p_8_zw2 in direction of the fourth intermediate pressure value p_8_zw4 coincides in time with the moment T_13 at which the adhesion of the second shifting element 7 is detected and the slip of the first shifting element 8, both by adequate motor control of the internal combustion engine 2 and by the increase of the transmitting capacity of the first shifting element 8, is reduced at the moment T_13 whereby the synchronous state of the first shifting element 8 is reached earlier than in the starting process according to FIG. 5. For this reason, the control pressure p_8 at the end of the pressure ramp, that is, at the moment T_16, is immediately raised without added retaining phase to the fifth pressure value p_8_zw5 whereby the first shifting element 8 is completely closed and led to its full transmitting capacity, there also taking place in the starting process according to FIG. 6, the load take-over phase between the moment T_16 and the moment T_17 at which the inventive method is terminated.

In the starting process on which FIG. 7 is based, the load take-over phase is already begun at the moment T_13 when the adhesion of the second shifting element 7 is detected and the first shifting element 8 is still in slip operation and is concluded while the first shifting element 8 still is slipping. This means that the moment T_17 precedes in time the moment T_14 at which the first shifting element 8 is essentially synchronously operated and the moment T_15 at which the control pressure p_i of the first shifting element is raised from the second intermediate pressure value p_8_zw2 via a pressure ramp to the fourth intermediate pressure value p_8_zw4 and the inventive method is only terminated at a moment T_19.

With the regulating structure, shown in FIG. 8, represented in the form of a block gearshift pattern, the above described inventive method can be applied during a starting process of the internal combustion engine of a parallel hybrid drive train with the aid of a simple regulation draft.

At the same time, a starting torque m_fahr_soll demanded by the driver when the internal combustion engine 2 is disengaged can at first be produced on the output 5 only via the electric engine 3 when the first shifting element 8 is closed and the second shifting element 7 open at the same time. Alternative to this, it obviously is also possible to raise the electric engine 3 to a predefined rotational speed value and control it at the rotational speed level, while the starting torque to be produced on the output 5 is produced on the output 5 via a slip operated first shifting element 8.

In case of a demand to engage the internal combustion engine 2, which can be issued as result of a too low load state of the electric accumulator, of a rotational speed condition of the electric engine 3, of a vehicle speed condition and/or a driver's wished torque condition, the first shifting element 8 is converted to slip operation by adequate reduction of the transmitting capacity or of an increase corresponding to the driver's wish of the input torque of the electric engine 3 while the driver's demanded nominal output torque m_fahr_soll can be produced on the output. The nominal output torque m_fahr_soll represents here a control parameter of the regulating structure according to FIG. 8 for the actual process or for the parallel hybrid drive train 1, according to FIG. 1, there being determined with reference to the nominal output torque m_fahr_soll the torque value conveyable via the first shifting element 8 or the transmitting capacity equivalent thereto of the first shifting element 8 using it as a control parameter for the m_fahr_soll can be adapted via a correction control block K1, referring in the correction control block K1 to applicatively determined correction factors.

Diverging herefrom, it is also possible for correction to use characteristic lines dependent on operating state by way of which can, in turn, be exactly determined correction factors dependent on operating state so as to make possible accurately to determine the torque that can be effectively passed to the actual operating state via the first shifting element 8. But, in addition, is also possible to determine the correction factors via adequate adaptation routines and use them for adaptation or correction of the control standard.

One other control parameter is constituted by the transmitting capacity of the second shifting element or the torque m_7 conveyable via the second shifting element 7 so that in case of a demand for engagement of the internal combustion engine, to couple in the inventive manner the internal combustion engine 2 to the electric engine 3 and start it.

After start of the internal combustion engine 2 in the regulating structure according to FIG. 8, a switch 2 is reversed and the input torque m_2 produced by the internal combustion engine 2 is fed as control parameter to the process or the parallel hybrid drive train 1 to be controlled. In addition, a nominal slip standard d_omg_soll of the first shifting element 8 is preset by way of which the actual rotational speed of the electric engine 3 is corrected in the nodal point 21, the correction value being fed to a regulation device 22 designed as proportional-integral regulator device the output value of which represents a regulating portion of the nominal standard of the input torque m_3 of the electric engine 3.

By regulating the differential rotational speed or the slip of the first shifting element 8 by way of the electric engine 3, the slip state of the first shifting element 8 is reliably maintained, IN addition to the standard of the regulation device 22 or of the nominal standard of the input torque m_3 determined by the regulation device 22, there are determined in the regulation structure according to FIG. 8 control portion of the nominal standard of the nominal standard of the input torque m_3 of the electric machine 3 according to load torques representative of the interference parameters of the regulation. At the same time, the nominal output torque m_fahr_soll, the same as the torque m_7 conveyable via the second shifting element 7 or the input torque m_2 produced by the engaged internal combustion engine 2, represent interference parameters for regulation of the rotational speed n_3 of the electric engine 3 which, depending on the operating state, can be adapted to the real system of the parallel hybrid drive train 1 via added correction control blocks K2 and K3 in the same manner as the nominal drive torque m_fahr_soll via the correction block K1.

The internal combustion engine 2 is increasingly brought to operative connection with the electric engine 3 by increasing the transmitting capacity of the second shifting element 7 the rotatable masses of the still disconnected internal combustion engine 2 standing as interference torque opposed to the input torque of the electric engine 3. This means that the interference torque appearing due to the engagement of the second shifting element 7 is at first strong as result of the strong friction an compression torques of the motor being overcome and after start of the internal combustion engine basically weakens again.

To the internal combustion engine 2 is preset as nominal parameter by the motor control unit 17 during the starting process a starting torque in the form of a nominal load adjustment or a target rotational speed such as the actual rotational speed of the electric engine 3 in order to convert the second shifting element 7 easily and within brief processing times to a synchronous state. After coupling of the internal combustion engine 2, via the second shifting element 7, the second shifting element 7 can be closed then resulting the load take-over from the electric engine to the internal combustion engine, but the closing of the second shifting element 7 and the load take-over are also simultaneously possible.

The interference torque of the regulation of the input rotational speed n_3 of the electric engine 3 that increases due to the increase of transmitting capacity of the shifting element 7 is under certain circumstances gated for reducing the load of the electric engine 3 by reducing the transmitting capacity of the second shifting element 7 while, diverging from the above described manner, the control pressure p_7 of the second shifting element, departing from the moment T_0 up to the moment T_12, an be continuously raised from the first intermediate pressure value p_7_zw1 to the third intermediate pressure value p_z_zw3 without in the meantime lowering the control pressure p_7 to the second intermediate pressure value p_7_zw2.

It is, in general, possible with the inventive method proposed to start the internal combustion engine even when the vehicle is stopped or at low speeds of the vehicle. In such operating states of the parallel hybrid drive train 1, the nominal slip standard d_omg_soll for the first shifting element 8 is to be preset so that the minimum rotational speed, that is, the starting rotational speed or the idle rotational speed of the internal combustion engine 2, is not fallen below. In such stating processes, the first shifting element 9 us not closed after start of the internal combustion engine and the regulation of the slip operation of the first shifting element 8 is also further carried out after start of the internal combustion engine 2.

The above described method is further adequate to operate a parallel hybrid drive train of a vehicle designed in the area between the electric engine 3 and the first shifting element 8 with a hydrodynamic coupling element and a frictionally engaged shifting element parallel therewith. The hydraulic coupling element, which can be designed as hydrodynamic torque converter, can be bypassed via a frictionally engaged shifting element disposed parallel therewith which, in a hydrodynamic torque converter, is designed as a so-called converter bypass clutch, to an extent such that when the shifting element is fully closed there exists a rigid through-drive between the electric engine 3 and the first shifting element 8 of the parallel hybrid drive train. This means that the operating characteristic of a drive train thus designed, when the frictionally engaged shifting element is fully closed, corresponds to the operating characteristic of a drive train designed between the electric engine and the first shifting element without a hydraulic coupling element and is thus operable without change of the inventive method above described.

REFERENCE NUMERALS 1 parallel hybrid drive train
2 internal combustion engine
3 electric engine
4 transmission
5 output
6 device for damping rotational irregularities
7 second shifting element
8 first shifting element
9 axle differential
10 wheels
11 brake system
12 brake booster
13 electric accumulator
14 electric control device
15 power supply
16 electric transmission control device
17 motor control unit
20 switch
21 nodal point
22 regulation device
d_omg_soll nominal slip standard
K1 to K3 correction control block
i ratio
m_2 input torque of internal combustion engine
m_7 transmitting capacity of the second shifting element
m_8 transmitting capacity of the first shifting element
m_fahr_soll nominal output torque
omg_ist actual rotational speed of the electric engine
n_2 input rotational speed of the internal combustion engine
n_3 input rotational speed of the electric engine
n_ab output rotational speed
p pressure
p_7 control pressure of the second shifting element
p_7_zw intermediate pressure value of the second shifting element
p_8 control pressure of the first shifting element
p_8_fa filling equalization pressure
p_8_sf quick filling pressure
p_8_zw intermediate pressure value of control pressure of the first shifting element
T0 to T19 moment
t time

The invention claimed is:

1. A method of operating a parallel hybrid drive train (1) of a vehicle including an internal combustion engine (2), an electric engine (3) located between the internal combustion engine (2) and an output (5), a first frictionally engaged shifting element (8) located between the electric engine (3) and the output (5) and a second frictionally engaged shifting element (7) located between the internal combustion engine (2) and the electric engine (3), comprising the steps of:

adjusting a nominal output torque (m_fahr_soll) on the output (5) by adjusting the transmitting capacity of the first shifting element (8) under control according to the required nominal output torque (m_fahr_soll) so that the first shifting element (8) has a transmitting capacity required for providing the nominal torque (m_fahr_soll) on the output (5), adjusting an input rotational speed (n_3) of the electric engine (3) under regulation during a starting process of the internal combustion engine (2) to maintain the first shifting element (8) in a slip operation and to provide the nominal output torque (m_fahr_soll) on the output (5) during at least the starting process of the internal combustion engine (2), including during the starting process of the internal combustion engine (2), adjusting the input rotational speed (n_3) of the electric engine (3) according to at least one of the nominal output torque (m_fahr_soll) on the output, a controlled standard (m_7) of the transmitting capacity of the second shifting element (7) and a regulation divergence between a nominal standard (d_omg_soll) of a slip of the first shifting element (8) and an actual slip (omg_ist) of the first shifting element (8), and adapting control portions of a nominal standard of the input torque (m_3) of the electric engine (3) by way of correction control blocks (K2, K3) to an actual operating state of the parallel hybrid drive train (1).

2. The method according to claim 1, further comprising the step of increasing the transmitting capacity of the second shifting element (7), when engagement of the internal combustion engine (2) is demanded, to a value needed for engaging the internal combustion engine (2), the disengaged internal combustion engine (2) is increasingly driven by the electric engine (3) as the transmitting capacity of the second shifting element (7) increases and a drag torque (m_7) that results therefrom and counters the input torque (m_3) of the electric engine (3) producing an interference parameter of the regulation of the input rotational speed (n_3) of the electric engine (3).

3. The method according to claim 1, further comprising the step of adjusting the transmitting capacity of the second shifting element (7), after engagement of the internal combustion engine (2), to a value that reduces the load of the electric engine (3) in relation to the load of the electric engine (3) prior to the engagement of the internal combustion engine (2).

4. The method according to claim 1, further comprising the step of adjusting the transmitting capacity of the second shifting element, after expiration of a predefined period of time, departing from the value required for the engagement of the internal combustion engine, to a value that reduces the load of the electric engine in relation to the load of the electric engine prior to the engagement of the internal combustion engine.

5. The method according to claim 1, further comprising the step of continuously adjusting the transmitting capacity of the second shifting element (7) to a value at which the second shifting element (7) has a full transmitting capacity.

6. The method according to claim 1, further comprising the step of operating the internal combustion engine (2), during a starting process, under control by of a nominal input torque curve or of a nominal input rotational speed and passing the second shifting element (7) to a synchronous state when the internal combustion engine (2) is engaged.

7. The method according to claim 6, further comprising the step of adjusting the transmitting capacity of the second shifting element (7), when the internal combustion engine (2) is engaged and in synchronous operating state of the second shifting element (7), to a value at which a torque abutting on the second shifting element (7) is transmitted at least slip-free.

8. The method according to claim 1, further comprising the step of increasing the transmitting capacity of the first shifting element (8), when the second shifting element (7) is synchronous, in a direction of a predefined value from the value equivalent to the nominal output torque (m_fahr_soll) abutting on the output (5) and examining, during an inquiry step, whether slip of the first shifting element (8) is below a predefined nominal slip value during a predefined period of time.

9. The method according to claim 8, further comprising the step of increasing the transmitting capacity of the first shifting element, when a result of the inquiry is positive, from the predefined value to the full transmitting capacity.

10. The method according to claim 8, further comprising the step of leaving the transmitting capacity of the first shifting element (8), when a result of the inquiry is negative, at the predefined value and after expiration of a monitoring period of time is increased to the full transmitting capacity.

11. The method according to claim 1, further comprising the step of taking over a load from the electric engine (3) to the internal combustion engine (2) when the second shifting element (7) is synchronous or engaged, and when the internal combustion engine (2) is engaged.

12. The method according to claim 1, further comprising the step of additionally adjusting the slip operation of the first shifting element (8) under control according to other operating state parameters (m_7, m_2) of the parallel hybrid drive train (1) which produce interference parameters of the regulation of the input rotational speed (n_3) of the electric engine (3).

13. The method according to claim 1, further comprising the step of feeding a regulation divergence, between the nominal standard (d_omg_soll) of the slip of the first shifting element (8) and of the actual slip (omg_ist) of the first shifting element (8), to a regulation device (22), and an exit value of which represents a regulated portion of the nominal standard of the input torque (m_3) of the electric engine (3) which is added to the control portions of the nominal standard of the input torque (m_3) of the electric engine (3).

* * * * *